United States Patent
Parfondry et al.

(10) Patent No.: US 10,323,118 B2
(45) Date of Patent: Jun. 18, 2019

(54) METHOD FOR PRODUCING A POLYURETHANE FOAM BY MICROCASTING

(71) Applicants: COMPAGNIE GENERALE DES ETABLISSEMENTS MICHELIN, Clermont-Ferrand (FR); Michelin Recherche et Technique S.A., Granges-Paccot (CH)

(72) Inventors: Alain Parfondry, Clermont-Ferrand (FR); Antonio Delfino, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 151 days.

(21) Appl. No.: 15/307,218

(22) PCT Filed: Apr. 21, 2015

(86) PCT No.: PCT/EP2015/058599
§ 371 (c)(1),
(2) Date: Oct. 27, 2016

(87) PCT Pub. No.: WO2015/165776
PCT Pub. Date: Nov. 5, 2015

(65) Prior Publication Data
US 2017/0051098 A1 Feb. 23, 2017

(30) Foreign Application Priority Data

Apr. 29, 2014 (FR) ..................................... 14 53898

(51) Int. Cl.
| | |
|---|---|
| *C08G 18/76* | (2006.01) |
| *C08G 18/48* | (2006.01) |
| *C08G 18/20* | (2006.01) |
| *B29D 30/06* | (2006.01) |
| *C08G 101/00* | (2006.01) |
| *B29K 105/04* | (2006.01) |

(52) U.S. Cl.
CPC ......... *C08G 18/7671* (2013.01); *B29D 30/06* (2013.01); *C08G 18/2081* (2013.01); *C08G 18/4833* (2013.01); *C08G 18/4837* (2013.01); *B29K 2105/04* (2013.01); *B29K 2875/00* (2013.01); *C08G 2101/0083* (2013.01); *C08G 2350/00* (2013.01); *C08G 2380/00* (2013.01)

(58) Field of Classification Search
CPC ................ B29D 30/06; B29K 2105/04; B29K 2875/00; C08G 18/10; C08G 18/48; C08G 18/2081; C08G 18/4833; C08G 18/4837; C08G 18/7671; C08G 2101/0083; C08G 2350/00; C08G 2380/00

See application file for complete search history.

(56) References Cited

U.S. PATENT DOCUMENTS

| | | | |
|---|---|---|---|
| 6,586,486 B2 * | 7/2003 | Falke .................. | C08G 18/165 521/124 |
| 2015/0151592 A1 * | 6/2015 | Parfondry ............ | B60C 19/002 152/450 |

FOREIGN PATENT DOCUMENTS

| | | |
|---|---|---|
| EP | 1 101 782 A2 | 5/2001 |
| WO | 2013/182477 A1 | 12/2013 |

OTHER PUBLICATIONS

International Search Report dated Aug. 20, 2015, issued by EPO in connection with International Application No. PCT/EP2015/058599.

* cited by examiner

Primary Examiner — John M Cooney
(74) Attorney, Agent, or Firm — Venable LLP

(57) ABSTRACT

A polyurethane foam based on MDI (diphenylmethane diisocyanate) and on a polyol with an ethylene oxide content of greater than 50%, is made by mixing, under pressure, to form a foaming liquid precursor of polyurethane foam: a first reactive liquid, referred to as liquid A, comprising (a) a urethane prepolymer based on a first portion of the MDI and on a first portion of said polyol, and (b) the second portion of the MDI in the free state, said prepolymer being dissolved in this second portion of MDI and a second reactive liquid, referred to as liquid B, comprising the second portion of said polyol and water as foaming agent. The amount of said polyol in the liquid B represents between 25% and 75% by weight of the total of said polyol; this method is advantageously used for casting a polyurethane foam into the cavity of a tire casing.

24 Claims, 2 Drawing Sheets

METHOD FOR PRODUCING A POLYURETHANE FOAM BY MICROCASTING

1. FIELD OF THE INVENTION

Figure 1:
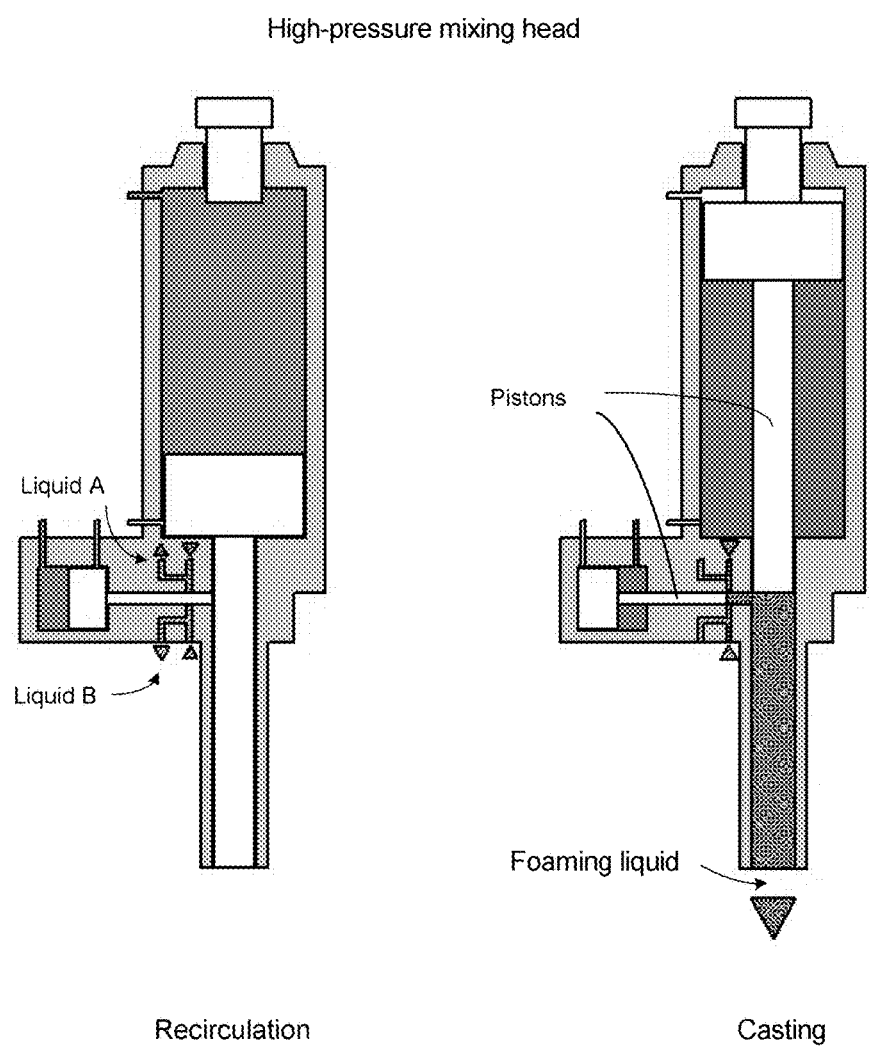

The invention relates to methods for manufacturing polymer foams.

It relates more particularly to formulating polyurethanes, to methods for manufacturing polyurethane foams and especially to the use of such foams for reducing the noise emitted by tyres when vehicles are running.

2. PRIOR ART

It will be briefly recalled here that, generally speaking, a polyurethane (abbreviated to "PU") is the product of the (condensation) reaction of a polyisocyanate (compound bearing at least two —NCO isocyanate functions) and of a polyol (compound bearing at least two —ROH alcohol functions), the polyol used generally having the alcohol functions thereof fixed either to polyethers or to polyesters.

In order to reduce the rolling noises of a tyre, in particular the cavity noise, it is known practice to provide the internal wall thereof with a layer of PU foam.

In particular, patent application WO 2013/182477 filed by the applicants described a tyre, in the vulcanized state, the inner wall of which is provided with a layer of PU foam based on a diphenylmethane diisocyanate (or methylene diphenyl diisocyanate, abbreviated to "MDI") and on a specific polyol with a high ethylene oxide content having an ethylene oxide content of greater than 50% (% by weight).

The PU foam is manufactured in situ, directly in the vulcanized tyre, by simultaneous "microcasting" (that is to say, at very low flow rates) of the reagents, urethane prepolymer and water, into the rotating tyre casing cavity. Thus, the reactive liquid (liquid component A) based on MDI and polyol expands immediately on contact with the foaming agent (water, liquid component B) to give a foam which rapidly solidifies on the inner surface of the tyre, is light and effectively absorbs noise.

The method described makes it possible, especially, to put the PU foam in place in a single step, without requiring all the prior operations (already known in the prior art) for preparing a foam, cutting to the desired dimensions then bonding the foam to the inside of the tyre. The physical properties of the PU foam, especially the acoustic performance thereof, may be adjusted by the specific formulation used and the amount of foam applied. A great level of freedom in terms of shapes is possible without prohibitive expense, since the reactive liquid may be deposited according to a predefined design.

Nonetheless, the method described also has a certain number of drawbacks.

First of all, it is carried out by means of a low-pressure type microcasting machine (Dosamix machine from Secmer; pressure of approximately 4 bar). Since the flow rate, amount and viscosity of the two liquid components are very different (for example only 2 parts water to 100 parts prepolymer; water flow rate of approximately 0.14 g/s), the dosage and the mixing have proved particularly tricky to carry out in semi-industrial conditions, in particular at the start and end of casting, given the very small amounts of foam to be produced for each cycle for treating a tyre casing.

In addition, these low-pressure machines with a constant mixing volume require rinsing of the mixing chamber after each casting operation, which drawback is added to by those of having to eliminate the solvent and the rinsing residues, material losses and of course the overall final cost resulting therefrom.

All the abovementioned drawbacks are relatively incompatible with high production rates, particularly for very short cycle durations (typically less than 1 min) and very low flow rates (typically less than 1 l/min), such as those targeted for the industrial-scale treatment of large series of tyre casings.

3. BRIEF DESCRIPTION OF THE INVENTION

Now, in the pursuit of their research, the applicants have found a novel manufacturing method which makes it possible to overcome the above drawbacks, this method being suited to both high-pressure type and low-pressure type mixers.

Consequently, the present invention relates to a method for manufacturing a polyurethane foam based on MDI and on a polyol with a high ethylene oxide content having an ethylene oxide content of greater than 50% (% by weight), in which the following are mixed, under pressure, to form a foaming liquid precursor of polyurethane foam:

a first reactive liquid, referred to as liquid A, comprising on the one hand (i) a urethane prepolymer based on a first portion of the MDI and on a first portion of said polyol, and on the other hand (ii) the second portion of the MDI in the free state, said prepolymer being dissolved in this second portion of MDI in the free state;

with a second reactive liquid, referred to as liquid B, comprising the second portion of said polyol and water as foaming agent, this method being characterized in that the amount of this polyol with a high content of ethylene oxide in the liquid B represents between 25% and 75% by weight of the total of this polyol.

It has been observed that, by virtue of the specific PU formulation and particularly of the very high ethylene oxide content thereof, it was possible to very significantly increase the amount of polyol in the liquid B without thereby degrading the properties and performance of the final foam, which was particularly unexpected. By virtue thereof, it becomes possible to use high-pressure mixing machines.

The method of the invention is advantageously used for the continuous casting of the foaming liquid precursor directly into the cavity of a tyre casing rotating on itself, to form and deposit in situ the PU foam inside said cavity.

Figure 2:
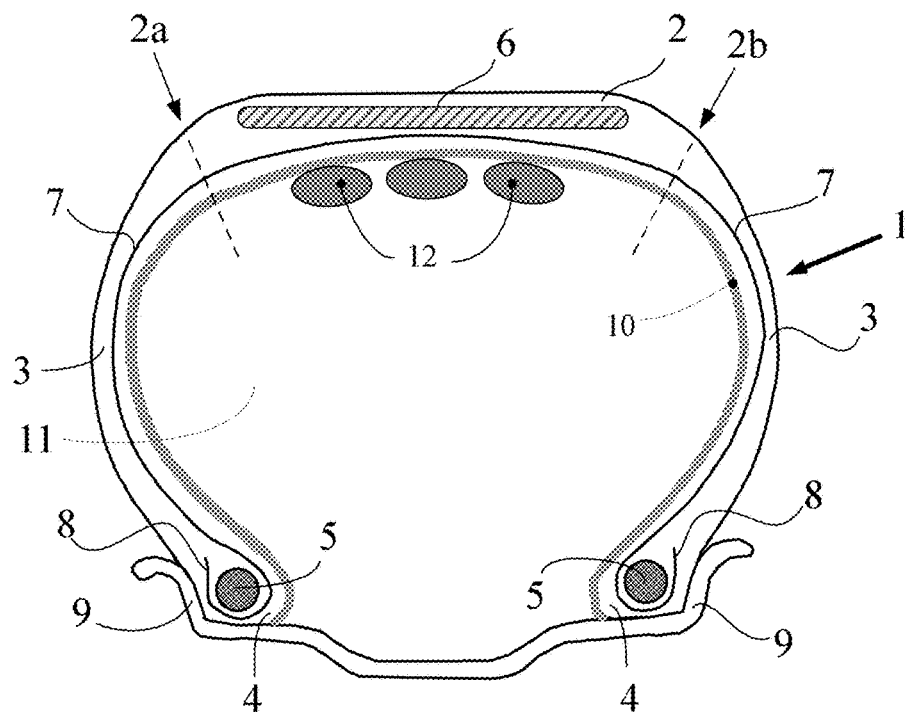

The invention and the advantages thereof will be readily understood in light of the following description and exemplary embodiments, and also FIGS. 1 and 2 which relate to these examples and which show schematically, very simply and without adhering to a specific scale:

the principle of a high-pressure mixing head in a machine for microcasting polyurethane suitable for the method of the invention (FIG. 1);

in radial cross section, an example of a vulcanized tyre, the inner cavity of which is provided with a strip of PU foam (FIG. 2).

4. DETAILED DESCRIPTION OF THE INVENTION

In the present description, unless expressly indicated otherwise, all percentages (%) given are percentages by weight.

Moreover, any range of values denoted by the expression "between a and b" represents the range of values extending from more than a to less than b (i.e. limits a and b excluded) whereas any range of values denoted by the expression "from a to b" means the range of values extending from a up to b (i.e. including the strict limits a and b).

The method of the invention, for manufacturing, by microcasting, a polyurethane foam based on an (at least one, that is to say one or more) "MDI" and on a (at least one, that is to say one or more) specific polyol with a high ethylene oxide content having a high ethylene oxide content of greater than 50% (% by weight), therefore comprises, as known step (according to the abovementioned application WO 2013/182477), that of mixing, under pressure, to form a foaming liquid precursor of polyurethane foam:

- a first reactive liquid, referred to as liquid A, comprising on the one hand a urethane prepolymer (already formed) based on a first portion of the MDI and on a first portion of said polyol, said prepolymer being dissolved in the second portion of MDI in the free state;
- with a second reactive liquid, referred to as liquid B, comprising the second portion of said polyol and water as foaming agent.

The above step of mixing is already known from the abovementioned application WO 2013/182477, in which, it is recalled, on the one hand the mixing is carried out in a conventional low-pressure machine, and on the other hand the proportion of said specific polyol in the liquid B is zero (or very low), indeed with what is referred to as the "prepolymer" route (with total or almost total pre-reaction of the two components of the polyol in the liquid A) clearly being preferred according to the teaching of this application.

On the contrary, it is to be noted that, in the case of partial pre-reaction (pre-mixing in the liquid A) of the two base constituents (MDI and polyol) before the final foaming, in accordance with the method of the present invention, reference will more specifically be made to the "semi-prepolymer route" or the "quasi-prepolymer route".

With this being recalled, the method of the invention is therefore characterized in that the amount of polyol with a high ethylene oxide content in the liquid B is particularly high compared to the teaching of the prior art, since it represents between 25% and 75% by weight of the total of said polyol, that is to say of the total of said polyol used in the liquids A and B. Preferably, this amount of said polyol in the liquid B represents between 30% and 70%, more preferentially still between 35% and 55% by weight of the total of said polyol.

The amount of water as foaming agent in the liquid B is, for its part, preferentially between 2% and 10%, more preferentially in a range from 3% to 8%, in particular in a range from 4% to 6% (% by total weight of liquid B).

This amount of water is especially adjusted such that the NCO index (or stoichiometric index) during foaming is between 0.7 and 1.3, preferably between 0.8 and 1.2. This index, widely used in PU foam technology, especially water-expanded PU foam, represents the [NCO]/[OH] molar ratio, including the OH functions (i.e. twice the number of moles of $H_2O$) provided by water; it is equal to 1 when stoichiometric proportions are used.

The hydroxyl number (OH number) of the polyol expressed in mg KOH/g of polyol, measured according to standard DIN 53240-2) may vary depending on the specific applications targeted. In the preferential case of a method according to the invention applied to a PU foam casting in the cavity of a tyre casing, this $I_{OH}$ index is preferably between 10 and 180, more preferentially between 20 and 120 mg KOH/g, in order to find an optimized compromise between rigidity (or flexibility) and other properties (in particular in terms of traction, elongation and compression set) of this foam.

For the same reasons as above, the number-average molecular weight (denoted Mn) of said polyol is preferentially between 1000 and 12 000 g/mol, more preferentially between 2000 and 8000 g/mol, this weight Mn being calculated, in the known way, from two items of supplier data: the hydroxyl number above and the functionality Fn of the polyol initiator (number of hydroxyl groups per molecule, readily determined for example by NMR analysis of the prepolymer, Mn then being equal to 56 100*Fn/$I_{OH}$).

The molar ratio of MDI (total) to said polyol (total) is preferentially between 2 and 10, more preferentially between 3 and 6, in particular between 4 and 5.

In the method of the invention, the weight ratio (liquid B/liquid A) is preferably greater than 0.25, more preferentially between 0.3 and 1.0, in particular within a range from 0.35 to 0.70.

Preferentially, the total flow rate of the two liquids A and B, during mixing, is between 0.1 and 1 liter/min (i.e. approximately between 2 and 20 g/s).

According to a preferential embodiment, MDI is the only diisocyanate, or, if several diisocyanate compounds are present, it constitutes the predominant diisocyanate by weight, preferentially representing in the latter case more than 50% of the total weight of the diisocyanate compounds. If several diisocyanates are present, MDI more preferentially still represents more than 70%, in particular more than 90% by weight of the total of the diisocyanate compounds. By way of example of another diisocyanate which may be used in a blend with MDI, mention will be made for example of TDI (toluene diisocyanate, conventionally used as a mixture of the 2,4- and 2,6-isomers).

Nonetheless, according to a particularly preferential embodiment, MDI, in particular 4,4'-MDI, is the only diisocyanate constituting the PU foam of the pneumatic tyre of the invention.

All the isomers of MDI may be used (especially 2,2'-MDI, 2,4'-MDI, 4,4'-MDI), and mixtures thereof, and also what are referred to as polymeric MDIs comprising, in addition to the MDI, oligomers of the following formula (where n is equal to or greater than 1):

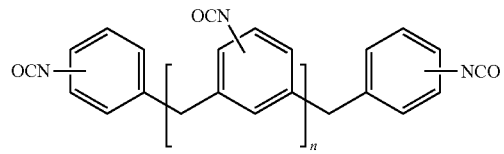

or mixtures of said abovementioned MDIs and polymeric MDIs. Compounds of carbodiimide/uretonimine, allophanate, urethane, urea or oxazolidone type, obtained by partial reaction of MDI with itself or with hydroxylated, aminated or epoxidized compounds, are also included.

More preferentially, the MDI used is 4,4'-MDI (4,4'-diphenylmethane diisocyanate), as a reminder of formula:

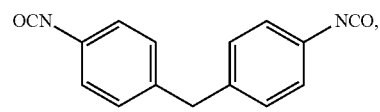

or, if several MDIs (diphenylmethane diisocyanates) are used, it constitutes the predominant MDI by weight, preferentially representing in the latter case more than 50% of the total weight of the MDI compounds; more preferentially still, if several MDIs are present, 4,4'-MDI represents more than 70%, in particular more than 90% by weight of the total of the MDI compounds.

According to another preferential embodiment, the polyol with a high ethylene oxide content (greater than 50%, preferably greater than 70%, more preferentially still greater than 90%) is the only polyol constituting the PU foam of the tyre of the invention, or, if several polyols are present, it constitutes the predominant polyol by weight; preferentially in the latter case more than 50% by weight of the total of the polyols used.

If several polyols are present, the polyol with a high ethylene oxide content preferentially represents more than 70%, more preferentially more than 90% by weight of the total of the polyols. By way of examples of other polyols which may be used in a blend with the polyol with a high ethylene oxide content, mention will be made for example of polyethers such as polyether polyols based on propylene oxide or on butylene oxide, or on other epoxide monomers, polyester polyols, polycarbonates, polyoxytetramethylene glycols or polyols of hybrid structure based on several of the abovementioned monomers.

Nonetheless, according to a particularly preferential embodiment, the polyol with a high ethylene oxide content (greater than 50%, preferably greater than 70%, more preferentially still greater than 90%) is the only polyol constituting the PU foam.

Preferentially, the polyol with a high ethylene oxide content is a polyol polymerized randomly with ethylene oxide and propylene oxide, with more preferentially between 50% and 90% by weight of ethylene oxide and from 10% to 50% propylene oxide; more preferentially still, the ethylene oxide content represents from 70% to 85%, especially from 75% to 80% by weight of such a polyol.

Such preferential polyols or polyethers are well known and commercially available, for example from BASF under the trade name Lupranol 2048, from Dow under the trade name Voranol CP1421, or else from Bayer under the trade name Desmophen 41WB01.

Preferentially, by virtue of the specific formulation of the liquids A and B described above, they may be mixed by high-pressure counter-current bringing together of the components, that is to say in a mixing machine with a high-pressure type injection head.

The principle of a high-pressure mixing head has been schematically represented in the appended FIG. 1, both in the position of casting the final foaming liquid and in the position of recirculation of the initial components (liquid A with excess isocyanate and liquid B essentially based on polyol and water).

It can be seen that the two components are firstly injected opposite one another, mixed under high pressure, then the mixture thereof (A+B) is cast, deposited directly, for example, inside the cavity of a rotating tyre casing. The mixing head is mechanically self-cleaning by virtue of the larger of its pistons, the smaller serving to shut off the inflow of the liquids A and B; very good operation is ensured even after prolonged stoppage.

This high-pressure technology does not require rinsing after casting, nor rinsing solvent, nor suppression of rinsing residues. The risks of material loss are eliminated, and manufacturing costs resulting therefrom are significantly reduced compared to a customary low-pressure machine as described for example in the abovementioned application WO 2013/182477.

The pressure for mixing the liquids A and B in the high-pressure mixing head is preferably greater than 50 bar, more preferentially greater than 100 bar. With regard to the mixing temperature, it is preferably between 20° C. and 80° C., more preferentially between 25° C. and 75° C.

Of course, the initial composition of the PU foam may also comprise other additives customary for this type of application, such as for example precursors of foaming agents other than water (for example a gas such as $CO_2$ directly), chain extenders, crosslinking agents, fillers, for example of mineral type such as silica, talc, chalk, calcium or barium salts, having a thixotropic effect, stabilizers, for example of alkanolamine type, aromatic primary amines, low molecular weight triols such as glycerol, aliphatic primary amines, catalysts such as tertiary amines, surfactants, antioxidants, rheology modifiers, viscosity regulators or thickeners (see for example application WO 2013/023125) such as polyethylene oxides or high molecular weight cellulose ethers, dyes or pigments.

The polyurethane foam thus formed has an apparent core density, measured according to standard ISO 845, which is preferably of between 0.020 and 0.070 $g/cm^3$, more preferentially within a range from 0.030 to 0.060 $g/cm^3$.

5. EXEMPLARY EMBODIMENTS OF THE INVENTION

The final PU foam could be prepared beforehand then cut to the desired dimensions, for example in the form of bands or narrower ribbons, and lastly bonded to the inside of a vulcanized tyre by any suitable means, for example by means of an adhesive composition or a double-sided adhesive tape, in a manner known per se.

The method of the invention is advantageously used for casting the foaming liquid precursor directly into the cavity of a tyre casing rotating on itself, to form and deposit in situ the polyurethane foam inside said cavity, as explained in detail in the following tests.

By way of example, appended FIG. 2 very schematically represents an example of a radial cross section of a motor vehicle tyre having a radial carcass reinforcement, in the cured (that is to say vulcanized) state, which tyre is able to be produced by the method of the invention.

This tyre 1 comprises a crown region 2 reinforced by a crown reinforcement or belt 6, two sidewalls 3 and two inextensible beads 4, each of these beads 4 being reinforced with a bead wire 5. The crown region 2, delimited laterally by two shoulders (2a, 2b) is surmounted by a tread (not shown in this schematic figure, for simplification), the belt 6 consisting, for example, of at least two superposed crossed plies reinforced by metal cords. A carcass reinforcement 7 is wound around the two bead wires 5 in each bead 4, the upturn 8 of this reinforcement 7 being for example arranged towards the outside of the pneumatic tyres, which here are shown fitted onto their rim 9. The carcass reinforcement 7 consists, as is known per se, of at least one ply reinforced by cords, referred to as "radial" cords, for example textile or metal cords, that is to say these cords are arranged practically parallel to one another and extend from one bead to the other so as to make an angle of between 80° and 90° with the circumferential mid-plane (the plane perpendicular to the axis of rotation of the pneumatic tyre, which lies halfway between the two beads 4 and passes through the middle of the crown reinforcement 6).

This tyre 1 also comprises, in a well-known way, an inner rubber layer 10 (commonly referred to as "inner liner") that defines the radially inner face of the tyre, in contact with the inflation cavity 11. This airtight layer 10 enables the tyre 1 to be inflated and kept pressurized; the airtightness properties thereof enable it to guarantee a relatively low rate of pressure loss, enabling the tyre to be kept inflated, in a normal operating state, for a sufficient duration, normally for several weeks or several months.

This tyre is characterized by the fact that the inner wall 10 thereof is at least partly covered, on the side of the cavity 11, with a PU foam layer 12 capable of partly absorbing the cavity noise. In accordance with the method of the invention, this PU foam layer has been manufactured in situ by direct casting of the reagents inside the cavity 11 of rotating tyres, onto the airtight layer 10.

More specifically, to obtain this PU foam in a high-pressure type microcasting machine (PSM 3000 type with GP 600 mixing head from Isotherm AG, Switzerland) as depicted schematically in FIG. 1 and already mentioned previously, the following are mixed under counter-current and under a pressure of approximately 200 bar:

100 parts by weight of a first reactive liquid (liquid A heated to approximately 70° C.), manufactured beforehand in a known way as indicated in abovementioned application WO 2013/182477, from approximately 45 parts of 4,4'-MDI (i.e. approximately 34 kg of Suprasec 1306 from Huntsman, in the liquid state) and approximately 55 parts of polyol with a high ethylene oxide content (i.e. approximately 41 kg of Lupranol 2048 from BASF; Mn equal to approximately 4100 g/mol); at the end of manufacturing, this product contained approximately 60% by weight of MDI in the free state—this is therefore, in a known way, a prepolymerized polyol solution in this MDI fraction in the free state; the percentage of —NCO bonds thereof (% by weight measured according to standard EN 1242) was equal to 13.5%;

with a second reactive liquid heated to approximately 30° C. (approximately 54 parts of liquid B for 100 parts of liquid A), comprising the other part of the polyol with a high ethylene oxide content (approximately 51 parts) and water (approximately 3 parts) as foaming agent; the NCO/OH index was equal to approximately 0.9; the liquid B also comprised the following additives in very small amounts: 0.5 parts of glycerine and 0.3 parts of diazabicyclo[2,2,2]octane.

The foaming liquid was cast in situ into the cavity of MICHELIN brand (Primacy HP) tyres, of 255/45 R18 dimensions, kept rotating (30 rpm) about their horizontal axis, in the form of a substantially cylindrical continuous strip (12) (diameter of approximately 30 mm) wound 3 times underneath the crown (as illustrated schematically in FIG. 1) at an angle of between 1.5 and 2.0 degrees relative to the circumferential direction of the tyre. The foam thus produced in situ (apparent core density equal to approximately 45 g/dm$^3$) moreover had excellent adhesion to the inner (wash-coated) rubber of the tyre.

The tyres thus prepared were then inflated to 2.5 bar and subjected to a rolling test and sound absorption test as described below, and compared to control tyres that were absolutely identical apart from the absence of PU foam in the cavity of these control tyres.

Performance with respect to cavity noise was evaluated as indicated in the abovementioned application WO 2013/182477, by rolling of the tyres tested on a macro-rough track (bituminous concrete having a particle size of 6 mm, with a macro-texture of 0.4 to 0.5 mm). The noise is recorded inside the vehicle (MERCEDES S-Class) using a mannequin equipped with an acoustic head (microphones placed at the bottom of artificial ears). The speed is stabilized and 4 recordings of 20 s each are carried out at a frequency of 4 kHz. The spectrum (resolution of 1 Hz) of the time signal recorded is calculated and the auto-spectra of each of the two ears and of each of the four recordings are averaged. The cavity noise is that measured (averaged) in a frequency range extending from 180 to 230 Hz, characteristic of the resonance of the air cavity contained in the tyre. At a speed of 60 km/h, it was observed that this cavity noise was reduced by approximately 2.5 dB(A) with respect to the control tyres. This result is expressed as sound energy (dB(A)) which corresponds to the integration of the sound pressure as a function of the frequency over the frequency range in question.

The performance in terms of cavity noise reduction therefore proved substantially identical to that described in application WO 2013/182477 mentioned in the introduction to the present document, which confirms an equivalent quality of PU foam, despite a manufacturing method and formulations of liquids A and B which have been notably altered.

In conclusion, by virtue of the specific polyurethane formulation and in particular the very high ethylene oxide content thereof, it has proved possible, unexpectedly without degrading the properties and performance of the final foam, to significantly increase the amount of polyol in the liquid B, thereby notably moving away from the "prepolymer" route (total pre-reaction of the MDI and the polyol) recommended by the prior art, and at the same time to use high-pressure mixing machines which are much more advantageous from an industrial perspective.

The invention claimed is:

1. A method for manufacturing a polyurethane foam based on diphenylmethane diisocyanate and on a polyol having an ethylene oxide content of greater than 50% by weight comprising the step of:

mixing a first reactive liquid and a second reactive liquid, under pressure, to form a foaming liquid precursor of polyurethane foam, wherein the first reactive liquid comprises (a) a urethane prepolymer based on a first portion of the diphenylmethane diisocyanate and on a first portion of the polyol and (b) a second portion of the diphenylmethane diisocyanate in the free state, said prepolymer being dissolved in the second portion of diphenylmethane diisocyanate in the free state, wherein the second reactive liquid comprises the second portion of the polyol and water as foaming agent, wherein the amount of the polyol in the second reactive liquid is between 25% and 75% by weight of the total of the polyol, wherein the first and second reactive liquids are mixed using high-pressure counter-current, and wherein the mixing pressure is greater than 50 bar.

2. The method according to claim 1, wherein the amount of the polyol in the second reactive liquid is between 30% and 70% by weight of the total of the polyol.

3. The method according to claim 2, wherein the amount of the polyol in the second reactive liquid is between 35% and 55% by weight of the total of the polyol.

4. The method according to claim 1, wherein the amount of water in the second reactive liquid is between 2 and 10% by weight.

5. The method according to claim 4, wherein the amount of water in the second reactive liquid is between 3 to 8% by weight.

6. The method according to claim 1, wherein the hydroxyl number of said polyol is between 10 and 180 mg KOH/g.

7. The method according to claim 6, wherein the hydroxyl number of said polyol is between 20 and 120 mg KOH/g.

8. The method according to claim 1, wherein the number-average molecular weight Mn of the polyol is between 1000 and 12 000 g/mol.

9. The method according to claim 8, wherein the number-average molecular weight Mn of the polyol is between 2000 and 8000 g/mol.

10. The method according to claim 1, wherein the molar ratio of diphenylmethane diisocyanate to the polyol is between 2 and 10.

11. The method according to claim 10, wherein the molar ratio of diphenylmethane diisocyanate to the polyol is between 3 and 6.

12. The method according to claim 1, wherein the NCO index during foaming is between 0.7 and 1.3.

13. The method according to claim 12, wherein the NCO index during foaming is between 0.8 and 1.2.

14. The method according to claim 1, wherein the weight ratio of the second reactive liquid to the first reactive liquid is greater than 0.25.

15. The method according to claim 14, wherein the weight ratio of the second reactive liquid to the first reactive liquid is between 0.3 and 1.0.

16. The method according to claim 1, wherein diphenylmethane diisocyanate is the only diisocyanate used, or, if several diisocyanates are used, diphenylmethane diisocyanate constitutes the predominant diisocyanate by weight.

17. The method according to claim 1, wherein the diphenylmethane diisocyanate is 4,4'-diphenylmethane diisocyanate.

18. The method according to claim 1, wherein the content of ethylene oxide of the polyol is greater than 70%.

19. The method according to claim 18, wherein the content of ethylene oxide of the polyol is greater than 90%.

20. The method according to claim 1, wherein a total flow rate of the first and second reactive liquids, during mixing, is between 0.1 and 1 liter/min.

21. The method according to claim 1, wherein the mixing pressure is greater than 100 bar.

22. The method according to claim 1 further comprising the step of casting the foaming liquid precursor of polyurethane foam into the cavity of a tire casing rotating on itself to form and deposit in situ the polyurethane foam inside said cavity.

23. The method according to claim 22, wherein the polyurethane foam thus formed in the cavity of the tire casing has an apparent core density, measured according to standard ISO 845, of between 0.020 and 0.070 g/cm$^3$.

24. The method according to claim 23, wherein the polyurethane foam thus formed in the cavity of the tire casing has an apparent core density, measured according to standard ISO 845, of between preferably within a range from 0.030 to 0.060 g/cm$^3$.

* * * * *